United States Patent
Joiner et al.

(10) Patent No.: US 11,794,358 B2
(45) Date of Patent: Oct. 24, 2023

(54) BUMPER COVER DEVICE FOR A MANUFACTURING ROBOT

(71) Applicant: Volvo Car Corporation, Gothenburg (SE)

(72) Inventors: David Allen Joiner, Summerville, SC (US); Carl Joseph Polivka, Sr., Ridgeville, SC (US); Dennis Legrand Martin, Jr., Summerville, SC (US)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/460,403

(22) Filed: Aug. 30, 2021

(65) Prior Publication Data
US 2023/0060829 A1    Mar. 2, 2023

(51) Int. Cl.
*B25J 19/00*    (2006.01)

(52) U.S. Cl.
CPC ....... *B25J 19/0075* (2013.01); *B25J 19/0029* (2013.01)

(58) Field of Classification Search
CPC ............... B25J 19/0025; B25J 19/0029; B25J 19/0075; B25J 19/0083; F16L 57/06
See application file for complete search history.

(56) References Cited

U.S. PATENT DOCUMENTS

| | | | |
|---|---|---|---|
| 4,969,795 A * | 11/1990 | Toyoda | B25J 19/0025 901/50 |
| 9,662,795 B2 * | 5/2017 | Yamaguchi | B25J 19/0075 |
| 2009/0224109 A1 * | 9/2009 | Hasunuma | B23K 11/315 248/52 |
| 2012/0318398 A1 * | 12/2012 | Schuster | F16L 11/118 138/140 |
| 2020/0078965 A1 * | 3/2020 | Souk | B25J 19/0083 |
| 2020/0347868 A1 * | 11/2020 | Hezel | E05B 17/2046 |
| 2020/0406481 A1 * | 12/2020 | Goto | B25J 19/0054 |

* cited by examiner

*Primary Examiner* — Charles A Fox
*Assistant Examiner* — Gregory T Prather
(74) *Attorney, Agent, or Firm* — Clements Bernard Walker; Christopher L. Bernard

(57) ABSTRACT

A snag point cover for an industrial manufacturing robot, the snag point cover including: a body adapted to be disposed about a protrusion extending from an external surface of an industrial manufacturing robot, wherein the body is adapted to form an external transition surface between the protrusion and the external surface of the industrial manufacturing robot thereby preventing a dresspack from becoming snagged on the protrusion when the industrial manufacturing robot is articulated. The snag point cover body is adapted to surround and cover one or more protrusions. The snag point cover body may be elongated or arcuate in shape and defines an internal cavity that conforms to the one or more protrusions. This allows external structures such as wiring harnesses and conduits to slide over these protrusions without becoming snagged or pinched during complex motion.

20 Claims, 5 Drawing Sheets

BUMPER COVER DEVICE FOR A MANUFACTURING ROBOT

TECHNICAL FIELD

The present disclosure relates generally to the manufacturing equipment field. More particularly, the present disclosure relates to a snag point cover for a manufacturing robot, such as that used in the automotive manufacturing field.

BACKGROUND

Modern vehicle manufacturing facilities make use of automated robotics to perform tasks with great accuracy. This considerably expedites the manufacturing process at the cost of both programming and maintaining these automated machines. The usability and reliability of these machines is vital to the operation of the production facility and can cause down-time if repairs are necessary.

The complex movements of these robots can cause challenges due to the dresspack, which may include components such as wires, wiring harnesses, and conduits, which is typically externally slung and connected at various points along the robot arm. The movements and rotations of the working end can cause the dresspack to become snagged and damaged over a period of time. This damage to the dresspack can cause the machine to be out of service, halting the manufacturing process and costing delays in production along with the cost of replacement parts.

Prior attempts to mitigate this issue involved attempting to estimate when the dresspack would be snagged or pinched and rerouting it in hopes of eliminating the movement during the robots motion. The repetitive motion of these robots makes it difficult to secure the dresspack and guess where it will shift. A more effective solution would be to eliminate the areas along the robot arm where the harness is prone to snagging and pinching. This could be accomplished by reducing the number of sharp edges and protrusions along the length of the robot where the dresspack may come in contact with the robot structure.

This background is provided as an illustrative contextual environment only. It will be readily apparent to those of ordinary skill in the art that the systems, assemblies, and methods of the present disclosure may be implemented in other contextual environments as well.

SUMMARY

The present disclosure provides the ability to ensure that the components affixed to an industrial manufacturing robot do not become damaged when coming into contact with protrusions that act as snag points and pinch points, thus allowing the robot to operate without damaging itself. The present disclosure provides a fixture that, when installed, conceals a protrusion in such a way that it changes the geometry of the exterior surface of the industrial manufacturing robot, alleviating any chance of a passing component from becoming snagged on the protrusion, in turn damaging the component. More specifically, the present disclosure provides a fitting that is installed over a protrusion, enclosing it in a body that provides a more fluid transition for other components sliding over a surface. The protrusion is concealed or surrounded by an outer protective surface that is designed to be smooth, acting as an extension of the surface to which it is attached, thereby preventing other components from damage as they come into contact with the surface during complex movements.

One example provided deals with a calibration point cover disposed on the end of a wrist member of an industrial manufacturing robot. This calibration point cover acts as a protrusion, which behaves as a snag point for the externally slung dresspack. This example extends the surface of the wrist member where the calibration point cover is disposed, providing a more tapered surface for the dresspack to slide across during articulation of the industrial manufacturing robot.

In one illustrative embodiment, the present disclosure provides a snag point cover for an industrial manufacturing robot, the snag point cover including: a body adapted to be disposed about a protrusion extending from an external surface of an industrial manufacturing robot, wherein the body is adapted to form an external transition surface between the protrusion and the external surface of the industrial manufacturing robot thereby preventing a dresspack from becoming snagged on the protrusion when the industrial manufacturing robot is articulated. The snag point cover body is adapted to surround one or more protrusions. Optionally, the protrusion is externally threaded, and the body is held by an internally threaded cap. The snag point cover body is adapted to cover one or more protrusions and may be elongated or arcuate in shape. The snag point cover body defines an internal cavity that conforms to the one or more protrusions. Optionally, the snag point cover body is adapted to be press-fit onto the one or more protrusions. Alternatively, the snag point cover body defines an inner surface comprising inner surface extensions.

In another illustrative embodiment, the present disclosure provides an industrial manufacturing robot, including: one or more industrial robot arms defining a working end and a base end; a dresspack disposed on the industrial robot arms; an industrial robot wrist member disposed on the working end of said industrial robot arms; an externally threaded calibration point disposed about an exterior surface of said industrial robot wrist member; an internally threaded calibration point cap disposed atop the calibration point; a snag point cover, including: a body disposed about the calibration point cap extending from the exterior surface of the industrial robot wrist member, wherein the body forms an external transition surface between the calibration point cap and the exterior surface of the industrial robot wrist member thereby preventing the dresspack from becoming snagged on the calibration point cap when the industrial manufacturing robot is articulated. The industrial manufacturing robot snag point cover surrounds the calibration point cap. The industrial manufacturing robot snag point cover body covers the calibration point cap. The snag point cover body is elongated and or arcuate in shape. The industrial manufacturing robot snag point cover body defines an internal cavity that conforms to the calibration point cap. Optionally, the industrial manufacturing robot calibration point is externally threaded, and the snag point cover is held by the internally threaded calibration point cap. The snag point cover body is manufactured from alternating colors of material such that the color is visible to a person to indicate wear on the component.

In a further illustrative embodiment, the present disclosure provides A method for installing a snag point cover for an industrial manufacturing robot disposed over one or more protrusions, the method including: aligning one or more cavities disposed on an inner surface of the snag point cover with the one or more protrusions disposed along a surface of the industrial manufacturing robot; and fastening the snag point cover onto said protrusions by press-fitting such that the snag point cover is affixed by friction. Optionally, the protrusion is an internally threaded calibration point cap fixed to an externally threaded calibration point, wherein the fastening step is accomplished by threading the calibration point cap onto the calibration point within the cavity such that the cap secures the snag point cover by pinching a flange between the calibration point and the calibration point cap.

BRIEF DESCRIPTION OF THE DRAWINGS

The present disclosure is illustrated and described herein with reference to the various drawings, in which like reference numbers are used to denote like system and assembly components/method steps, as appropriate, and in which.

DETAILED DESCRIPTION

The present disclosure offers the ability to ensure that a dresspack will be protected from any snag points or pinch points during the motion of an industrial robot without causing damage to the surrounding equipment, consequently allowing the uninterrupted operation of the machines intended duty. The present disclosure covers any snag points or pinch points allowing the surrounding structures to slide over the surface without becoming damaged. Specifically, the present disclosure offers a fitting that is installed onto the area where a snag point is present, encompassing or surrounding the protrusion, thus changing the geometry of the structure to a more tapered surface. The fitting is designed to conform to the outer surface of the structure where a protrusion is present thus mitigating the risk of a dresspack or similar equipment becoming damaged during continuous operation due to constant stress on the components. This allows the industrial robots to perform their tasks more efficiently and last longer between maintenance cycles while increasing the safety of the work environment.

More specifically, one example of the present disclosure specifies a calibration point cap fixed to an industrial manufacturing robot. This calibration point cap acts as a protrusion on the industrial robot wrist member. This example of the present disclosure offers the ability to cover or surround this calibration point cap and create a more tapered surface transition between the exterior surface of the industrial manufacturing robot and the protrusion created by the calibration point cap. This fixture protects a dresspack from becoming damaged on the calibration point cap during articulation of the robot arms.

Figure 1:
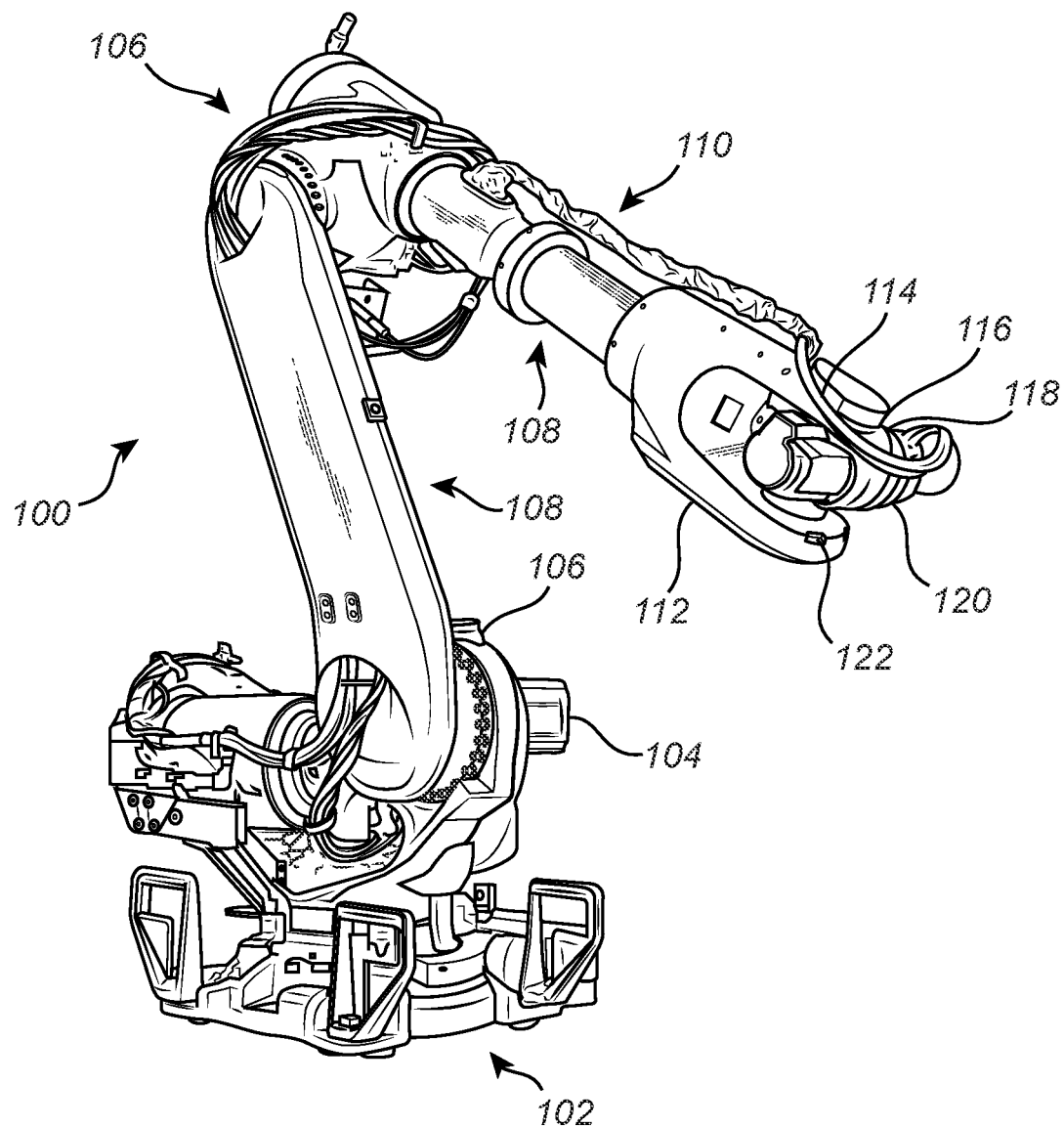
FIG. 1 is a perspective view of an industrial robot with an accessory tool flange, wiring harness, and conduit attached externally.

Referring now specifically to FIG. 1, the industrial manufacturing robot 100, such as an automotive manufacturing robot or the like, is affixed atop a base 102 and includes industrial robot arms 108 which are connected at a plurality of joints 106. These joints 106 are controlled by motor units 104 which generate the motion of the industrial manufacturing robot 100 and allow a significant range of motion for several manufacturing processes. An industrial robot wrist member 112 is provided at the end of the arm 108 furthest from the base 102, comprising a calibration point 116 by which the component may be calibrated. A calibration point cap 118 is fastened to the calibration point 116, typically by way of threads or a plurality of other similar means known to one of ordinary skill in the art. This calibration point cap 118 shields the calibration point 116 from foreign objects and debris that may be found in a manufacturing facility. An accessory tool flange 120 is fixed to the industrial robot wrist member and is used to accept various tool attachments that may be useful in a manufacturing facility.

As illustrated, the industrial manufacturing robot 100 electronics, such as the motor units 104 and accessory tools, are fed power by the wiring harness 110 which is draped along the exterior of the industrial manufacturing robot 100, and attached at a plurality of points, as to allow the motion of the robot without excessive stress being placed on the wiring harness 110. A conduit 114 is used to surround the wiring harness 110 at the industrial robot wrist joint to protect the internals of the wiring harness 110 as the robot performs its intended responsibilities due to the complex movements of the member. The combination of said wires/wiring harness 110 and conduit 114 are referred to as a dresspack and will be referred to as such from here on. The dresspack may also include components which feed materials to a tool fixed to the accessory tool flange 120, such as stud welding tools and others known to one of ordinary skill in the art. During articulation of the industrial robot arms 108, the dresspack rubs against the calibration point cap 118 and becomes damaged due to snagging and pinching.

Figure 2:
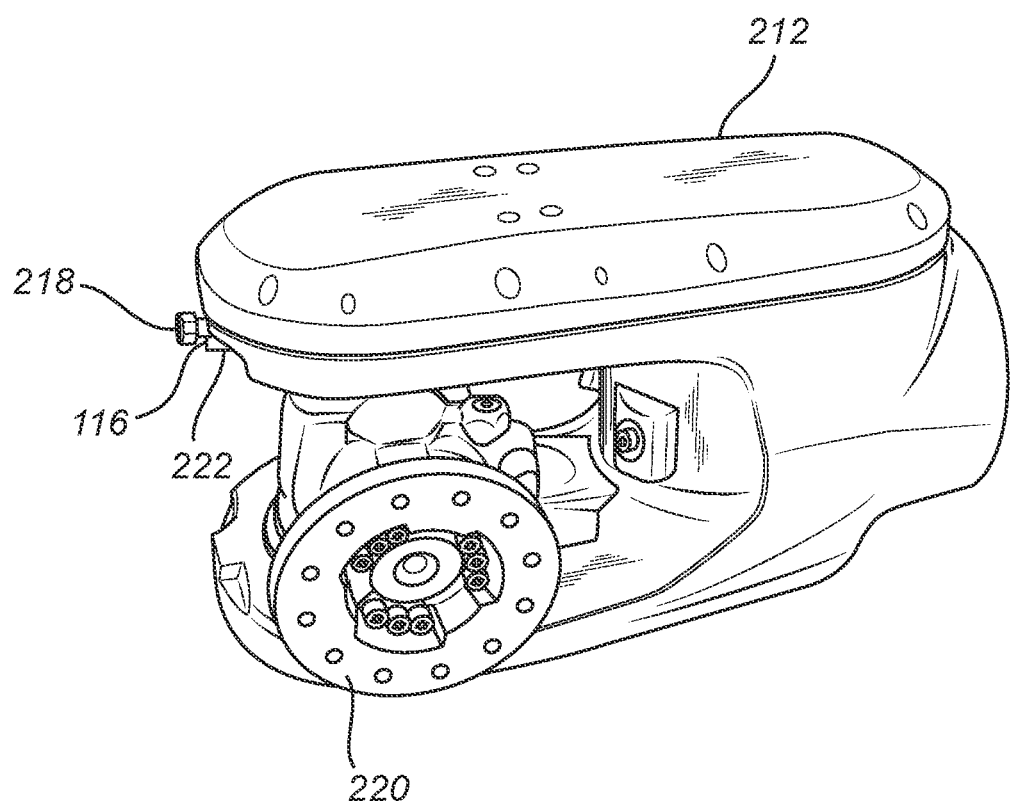
FIG. 2 is a perspective view of an industrial robot wrist member and calibration point protected by a calibration point cap with an accessory tool flange attached thereon.

Referring now specifically to FIG. 2, the industrial robot wrist member 212 of an industrial manufacturing robot 100 (FIG. 1) such as an automotive manufacturing robot along with others, includes a calibration point 216 by which the robot may be connected to other equipment and calibrated, and a calibration point cap 218 which protects the calibration point 216, and acts as a protrusion which behaves as a snag point and pinch point that can damage other equipment during operation. This calibration point cap 218 is only one illustrative example of a snag point and it will be readily apparent to one of ordinary skill in the art that the present disclosure can be adapted to perform its intended task for any protrusion that may act as a snag point. The calibration point cap 218 is threaded onto the calibration point 216 to secure it in place. These components are positioned along the outer surface of the industrial robot wrist member 212 and can be found along the surface of the industrial manufacturing robot 100 (FIG. 1) at numerous points. Normally, the industrial robot wrist member 212 is made from metal suitable for an industrial application. An accessory tool flange 220 is fastened to the industrial robot wrist member 212 allowing the connection of a variety of tools needed for manufacturing purposes (welding, painting, etc.) for specific industries such as automotive manufacturing. The accessory tool flange 220 being connected to the industrial robot wrist member 212 in a manner which it can be precisely controlled by internal mechanisms housed inside of the industrial robot wrist member 212, although these mechanisms are not described in greater detail herein. The indentations 222 are an example of the complex geometry that the illustrative embodiment can be designed to conform to. During normal operation, the calibration point 216 is covered by the calibration point cap 218 to protect the calibration point 216 from debris and other foreign contaminants that may be present in an industrial manufacturing facility. The calibration point cap 218 acts as a snag point and a pinch point which in turn damages the external dresspack during repetitive motion taking place during the manufacturing process. This creates a productivity issue due to the industrial robot being out of service for repair, causing considerable downtime and added cost to the operator.

Figure 3:
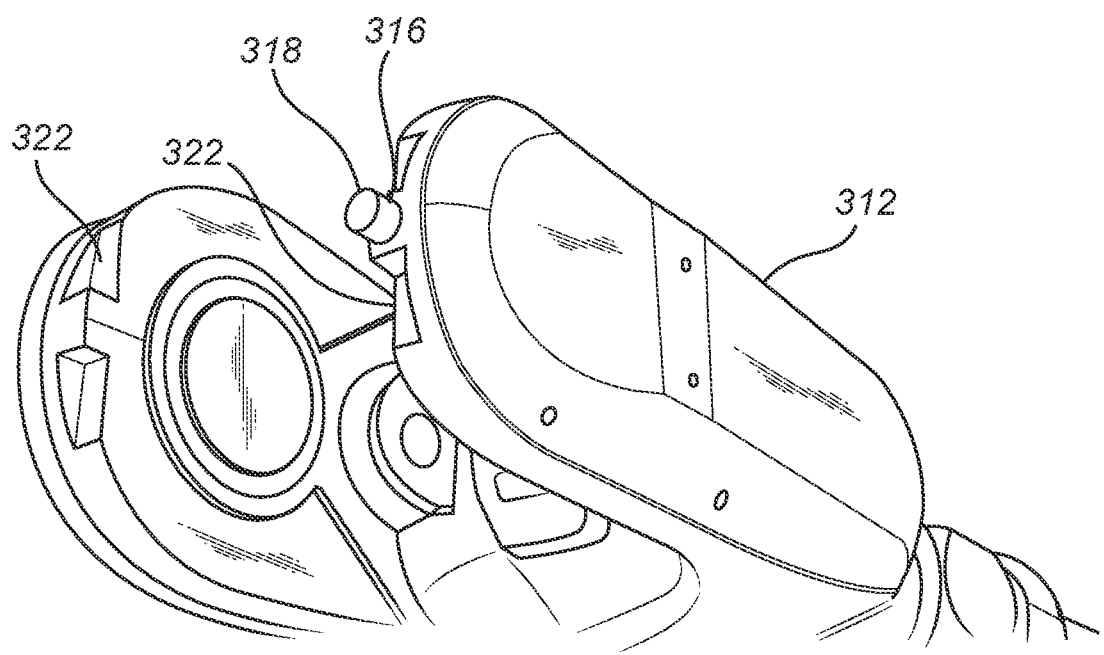
FIG. 3 is a partial perspective view of an industrial robot wrist member and calibration point protected by a calibration point cap with an accessory tool flange not present.

Referring now specifically to FIG. 3, the industrial robot wrist member 312 again includes a calibration point 316 that is covered by a calibration point cap 318 that is present to protect the calibration point from debris and other foreign contaminants during the operation of the industrial manufacturing robot 100 (FIG. 1).

Figure 4:
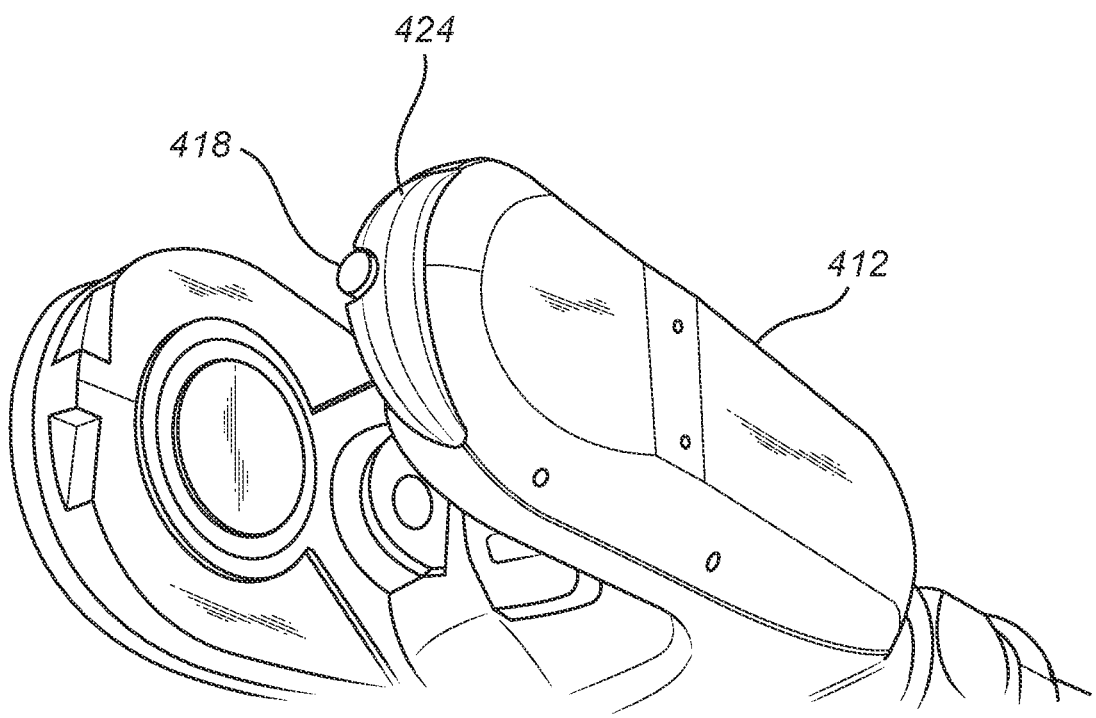
FIG. 4 is a partial prospective view of one illustrative embodiment of the snag point cover of the present disclosure installed onto an industrial robot wrist member surrounding the calibration point cap with the tool flange not attached, such that the possibility of the wiring harness or other similar equipment becoming snagged or pinched is alleviated.

Referring now specifically to FIG. 4, the industrial robot wrist member 412 again includes the calibration point cap 418 which is threaded onto the calibration point 116 (FIG. 1) and the indentations 322 which are discussed further below. Additionally, the snag point cover 424 of the present disclosure is shown fixed to the industrial robot wrist member 412. The snag point cover 424 conforms to the shape of the industrial robot wrist member 412, including complex geometries such as the ones represented by the indentations 322. This snag point cover 424 changes the geometry of the external surface of the industrial robot wrist member 412 to allow for a more tapered surface, thus eliminating any snag points or pinch points created by protrusions such as the protrusions created by the calibration point cap 418. By having a more tapered surface, there is no risk of external structures such as the dresspack becoming damaged as it brushes up against the surface of the industrial manufacturing robot 100 (FIG. 1) or the surface of the industrial robot wrist member 412 during repeated articulation. The snag point cover 424 being manufactured from polymer material, or any rigid material by way of molding, 3-D printing, etc. can be designed to fit any surface shape. In the present disclosure, the snag point cover 424 has an arched shape which is 3-D modeled to have a form fitting surface, which conforms to the outer structure of the industrial robot wrist member 412.

As illustrated, the snag point cover 424 is modeled to fit around the calibration point cap 418 allowing access to it with the snag point cover 424 affixed. In the present disclosure, the snag point cover 424 is designed with this open portion to allow the calibration point cap 418 to be removed with or without the snag point cover 424 in place. For ease of assembly, and to reduce the number of components, the snag point cover 424 may be affixed to the industrial robot wrist member 412 by aligning the cavity 530 (FIG. 5) with the calibration point 116 (FIG. 1) and threading the calibration point cap 418 onto the calibration point 116. The present disclosure having a flange 526 to catch the calibration point cap 418, therefore fixing the snag point cover 424 to the surface whenever the calibration point cap 418 is threaded onto the calibration point 116 (FIG. 1). This snag point cover 424 may also be designed to be fixed using other methods, one of which being press fit onto the calibration point cap 418 or other snag point which is desired to be covered. In this illustrative embodiment, the snag point cover 424 is produced using additive manufacturing to ensure the complex geometries for the snag point cover 424 to be form fitting as well as durable enough to withstand constant use in an industrial environment. The snag point cover 424 is constructed using internal layers of alternating colors to show the amount of wear on the component with relative ease. The repeated motion of the industrial robot 100 (FIG. 1) causes the dresspack to rub against the snag point cover 424 wearing the material away over time. The use of different colored materials in distinct layers allows the indication of the amount of wear being experienced by the snag point cover 424. The use of additive manufacturing allows this layered design to be accomplished with little to no additional effort in the manufacturing process and allows the use of different colors of material to indicate the level of wear on the snag point cover 424 by a person observing the machine from a distance.

Figure 5:
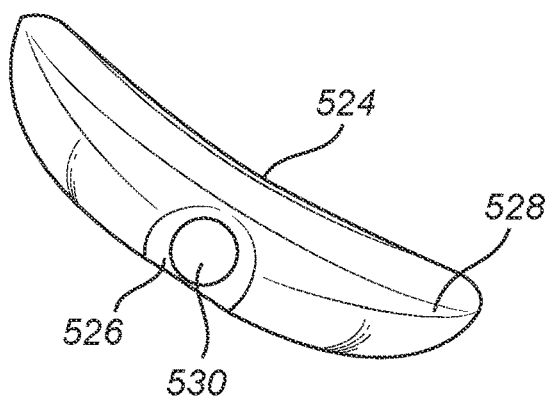
FIG. 5 is a front perspective view of one illustrative embodiment of the snag point cover of the present disclosure.

Referring now specifically to FIG. 5, the snag point cover 524 of the present disclosure includes the outer protective surface 528 that is the arched exterior making up the outer surface of the fixture, a cavity 530 extending through or partially through the snag point cover 524, and a flange extending radially from the inner surface of the cavity 530 along the inner surface 632 (FIG. 6) of the snag point cover 524. The flange 526 is designed to be part of the fixture and is manufactured along with the snag point cover 524 as one continuous piece. The cavity 530 is designed to fit over a protrusion, such as the calibration point cap 118 (FIG. 1), or any other protrusion that may act as a snag point or pinch point for surrounding components. The placement of the cavity 530 may be placed anywhere on the fixture, as necessary to allow for a more tapered outer protective surface 528. One or more, likely a plurality, of these cavities 530 may be necessary for the concealment of unwanted protrusions. The cavity 530 may also be designed to fit around any shape of protrusion, passing completely through, or partially through the snag point cover 524, depending on the installation method and access requirements. Each of the snag point cover 524 and the components thereon may be manufactured (molded, 3-D printed, etc.) from any suitable semi-rigid or rigid material.

As illustrated, the outer protective surface 528 of the snag point cover 524 is constructed to be smooth, allowing nearby structures to glide over without becoming snagged or pinched. In this embodiment, the outer protective surface 528 is curved to match the outer surface of the industrial robot wrist member 112 (FIG. 1) and act as an extension of the member to cover the snag point, in this case the calibration point cap 118 (FIG. 1), thus allowing the dresspack to glide over the surface without becoming damaged. The flange 526 of the current disclosure serves as a member to secure the snag point cover 524 to the desired location. The inner diameter of the flange 526 is smaller than the diameter of the currently described calibration point cap 118 (FIG. 1). This allows the snag point cover 524 to be secured to the industrial robot wrist member 112 whenever the calibration point cap 118 (FIG. 1) is threaded onto the calibration point 116 (FIG. 1). As the calibration point cap 118 is installed, it will nest into the cavity 530, and secure the flange 526 between the outer surface of the industrial robot wrist member 112 and the calibration point cap 118. This allows the use of less components and ensures the protection of the calibration point 116, as well as the protection of the dresspack from rubbing against the calibration point cap 118. As depicted above, the inner diameter of the cavity 530 is larger than the diameter of the calibration point cap 118. This enables the calibration point cap 118 to nest inside of the cavity 530, allowing the snag point cover 524 to surround the protrusion, in this case, the calibration point cap 118.

In the current disclosure, the snag point cover 524 is secured to the industrial robot wrist member 112 by way of the flange 526 and the calibration point cap 118. It will be readily apparent to one of ordinary skill in the art that other means of securing the snag point cover 524 exist, such as having the cavity 530 proportioned to the protrusion to have a press-fit. In this embodiment, the snag point cover can be installed by simply pressing the fixture onto the desired protrusion, eliminating the need for additional components.

In this illustrative embodiment, the material from which the outer protective surface 528 of the snag point cover 524 is constructed includes alternating layers of rigid material with different colors. This allows the deterioration of the component to be displayed as the surface is worn down by other members brushing against the outer protective surface 528. The layered colors of material will act as a visual alert to an operator, letting the operator know that the component may need to be replaced. This results in a more efficient way of detection since the machine will not need to be interrupted for the purpose of inspecting the snag point cover.

Figure 6:
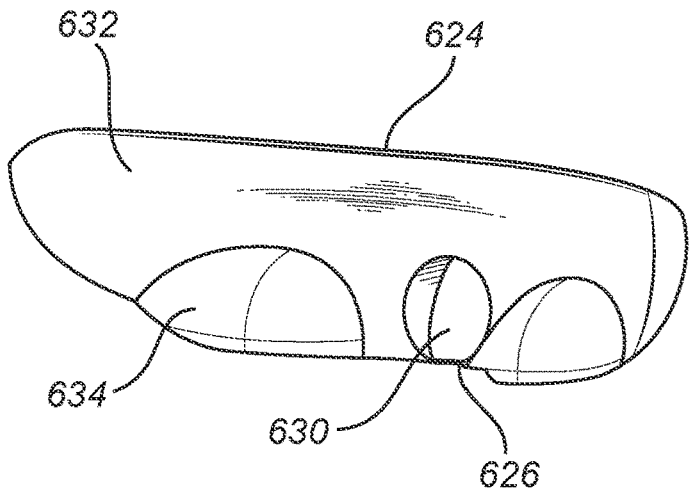
FIG. 6 is a back perspective view of one illustrative embodiment of the snag point cover of the present disclosure.

Referring now specifically to FIG. 6, the snag point cover 624 again includes the cavity 630 that is disposed through or partially through the snag point cover 624 that is configured to receive the protrusion, in this case, the calibration point cap 118. The snag point cover 624 also again includes the flange 626 that extends radially from the inner surface of the cavity 630. In this embodiment, the flange 626 again has an inner diameter which is smaller than the diameter of the calibration point cap 118. The snag point cover 624 is thereby secured to the industrial robot wrist member 112 (FIG. 1) by aligning the cavity 630 with the calibration point 116 (FIG. 1) and threading the calibration point cap 118 onto the calibration point 116. The snag point cover 624 includes an inner surface 632 that is designed to sit flush on top of the desired surface, in this case, the industrial robot wrist member 112 (FIG. 1). In this illustrative embodiment, the inner surface 632 is an arched portion making up the face of the snag point cover 624 that is configured to mate to the surface of the industrial robot wrist member 112. It is shaped to mimic the exterior surface of the industrial robot wrist member 112 to allow for a smooth transition between the components. the inner surface 632 includes the inner surface extensions 634 which fit into the indentations 222 (FIG. 2), thus allowing the snag point cover to be aligned correctly. These inner surface extensions 634 are a component of the present disclosure and can be altered to fit into any indentations or be left out if the mating surface does not include indentations 222 such as the ones found on the industrial robot wrist member 112.

In the current disclosure, the snag point cover 624 again is secured to the industrial robot wrist member 112 by way of the flange 626 and the calibration point cap 118. As the calibration point cap 118 is installed, it will nest into the cavity 630, and secure the flange 626 between the outer surface of the industrial robot wrist member 112 and the calibration point cap 118. The flange 626 is positioned inside of the cavity 630, flush with the inner surface 632 to allow the calibration point cap 118 to be threaded onto the calibration point 116 leaving sufficient thread for this purpose. Again, it will be readily apparent to one of ordinary skill in the art that other means of securing the snag point cover 624 exist, such as having the cavity 630 proportioned to the protrusion to have a press-fit. In this embodiment, the snag point cover can be installed without the need of a separate fastener, instead by simply pressing the fixture onto the desired protrusion.

Figure 7:
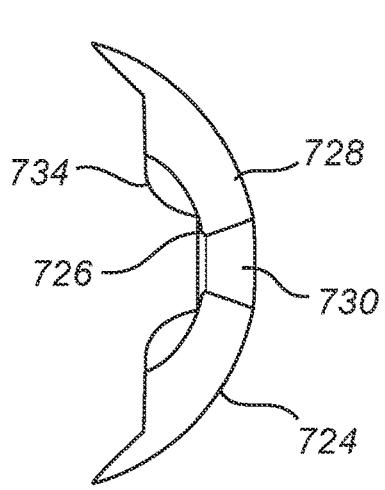
FIG. 7 is a top planar view of one illustrative embodiment of the snag point cover of the present disclosure.

Referring now specifically to FIG. 7, the snag point cover 724 of the present disclosure again includes the outer protective surface 728 that is the curved exterior making up the outer surface of the snag point cover 724, a cavity 730 extending through or partially through the snag point cover 724, and a flange extending radially from the inner surface of the cavity 730 flush with the inner surface 632 (FIG. 6) of the snag point cover 724. The flange 726 is again designed to be part of the fixture and is manufactured along with the snag point cover 724 as one continuous piece. The cavity 730 is again designed to fit over a protrusion, such as the calibration point cap 118 (FIG. 1), or any other protrusion that may act as a snag point or pinch point for surrounding components such as the dresspack. Again, the location of the cavity 730 may be placed anywhere on the fixture, and in any quantity as necessary to allow for a more fluent outer protective surface 728. Again it will be readily apparent to one of the ordinary skill in the art that a plurality of these cavities 730 may be necessary for the concealment of unwanted protrusions. The cavity 730 of the present disclosure is circular in shape but may be manufactured to be any shape necessary for the concealment of a protrusion.

In this illustrative embodiment, the cavity 730 has a depth that is sufficient to conceal the calibration point cap 118, thus eliminating the possibility of the dresspack becoming damaged from the protrusion created by the calibration point cap 118. It will be apparent to one of ordinary skill in the art that the depth of the cavity 730 and the thickness of the snag point cover 724 can be altered to conceal any protrusion that serves as a risk to other components.

Figure 8:
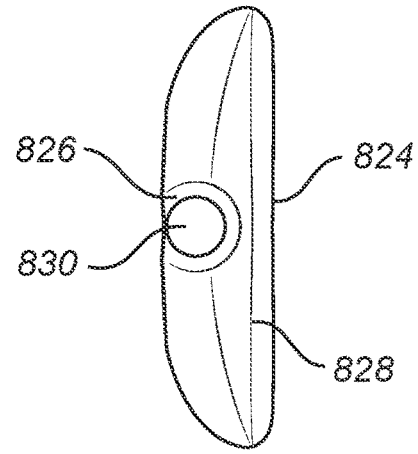
FIG. 8 is a front planar view of one illustrative embodiment of the snag point cover of the present disclosure.

Referring now specifically to FIG. 8, the snag point cover 824 of the present disclosure again includes the outer protective surface 828 that is the arched exterior making up the outer surface of the fixture, a cavity 830 extending through or partially through the snag point cover 824, and a flange extending radially from the inner surface of the cavity 830 along the inner surface 632 (FIG. 6) of the snag point cover 824.

Figure 9:
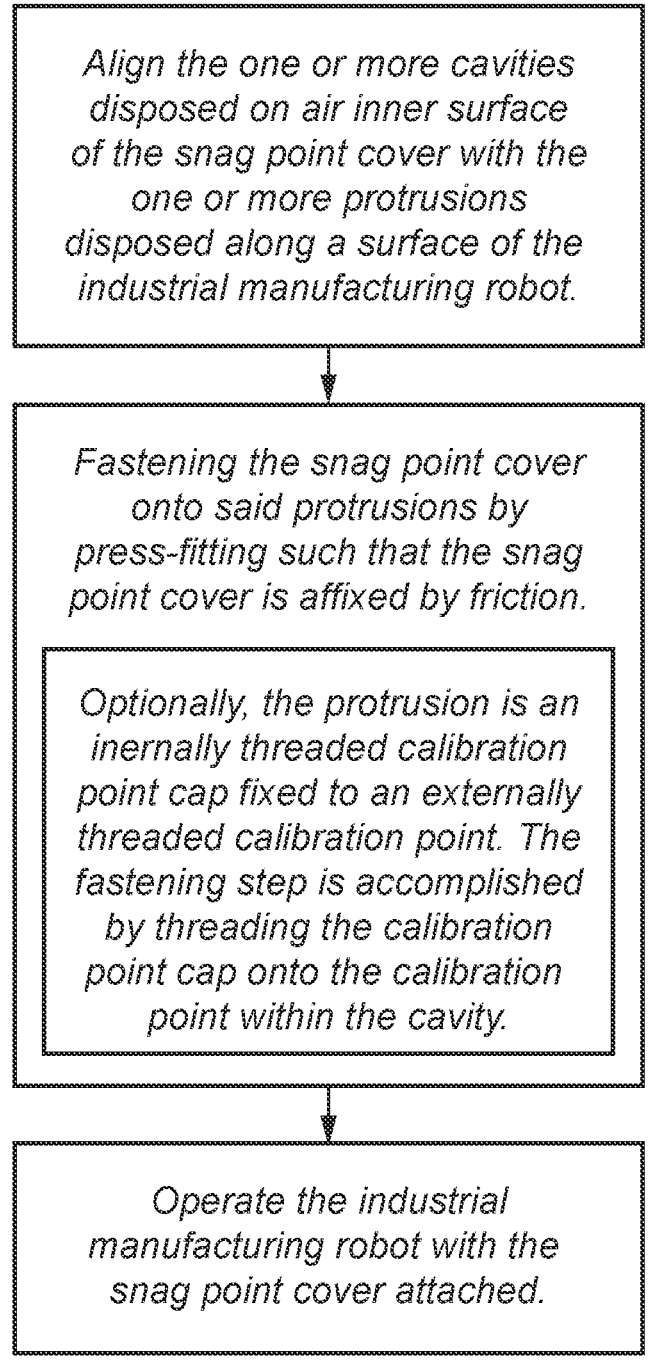
FIG. 9 is a flowchart of one illustrative embodiment of the method for installing the snag point cover of the present disclosure, such that the possibility of the wiring harness becoming snagged or pinched is alleviated.

FIG. 9 is a flowchart of one illustrative embodiment of a method 900 for installing the snag point cover of the present disclosure, such that the protrusion created by the calibration point cap or any other protrusion is concealed. The method 900 first includes aligning the one or more cavities disposed on an inner surface of the snag point cover with the one or more protrusions disposed along a surface of the industrial manufacturing robot. The method 900 then includes fastening the snag point cover onto said protrusions by press-fitting such that the snag point cover is affixed by friction. Optionally, this step may be accomplished by threading the calibration point cap onto the calibration point within the cavity of the snag point cover. Finally, the method 900 includes operating the industrial manufacturing robot with the protrusion covered such that the dresspack does not become damaged.

Consequently, by the use of the snag point cover of the present disclosure, industrial manufacturing robots can be operated without damaging the dresspack. This allows the wiring harness and the conduit to slide over protrusions without becoming snagged or pinched during the repeated motion of the robot. Thereby preventing damage to the components that make up the dresspack and avoiding any manufacturing downtime to repair or replace any components that may become damaged over time. Because the present disclosure protects the vulnerable components from damaging abrasion, fewer repairs and replacements are necessary, reducing the amount maintenance required and saving time and money in a manufacturing facility.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A snag point cover for an industrial manufacturing robot, the snag point cover comprising:
    a body adapted to be removably disposed about a protrusion extending from an outermost external surface of a wrist member disposed at an end of an arm of the industrial manufacturing robot, wherein the protrusion comprises a calibration point by which calibration equipment is connected to the industrial manufacturing robot, wherein the body is adapted to form an external transition surface between the protrusion and the outermost external surface of the wrist member disposed at the end of the arm of the industrial manufacturing robot thereby preventing a dresspack from becoming snagged on the protrusion when one or more of the wrist member and the arm of the industrial manufacturing robot is/are articulated.

2. The snag point cover of claim 1, wherein the body is adapted to surround or cover the protrusion.

3. The snag point cover of claim 1, wherein the body is adapted to receive the protrusion there through and be held in place by a cap affixed to the protrusion.

4. The snag point cover of claim 1, wherein the body is adapted to surround or cover the protrusion and a plurality of other protrusions simultaneously.

5. The snag point cover of claim 1, wherein the body is elongated.

6. The snag point cover of claim 1, wherein the body is arcuate.

7. The snag point cover of claim 1, wherein the body defines an internal cavity that conforms to a shape of the protrusion.

8. The snag point cover of claim 1, wherein the body is adapted to be press-fit onto the protrusion.

9. The snag point cover of claim 1, wherein the body defines an inner surface comprising one or more inner surface extensions adapted to contact the external surface of the industrial manufacturing robot adjacent to the protrusion.

10. An industrial manufacturing robot, comprising:
    one or more arms defining a working end and a base end;
    a dresspack coupled to the one or more arms;
    a wrist member disposed on the working end of one of the one or more arms;
    a protrusion disposed on an outermost external surface of the wrist member;
    a snag point cover removably coupled to the wrist member, comprising:
        a body adapted to be removably disposed about a protrusion extending from an outermost external surface of a wrist member disposed at an end of an arm of the industrial manufacturing robot, wherein the protrusion comprises a calibration point by which calibration equipment is connected to the industrial manufacturing robot, wherein the body is adapted to form an external transition surface between the protrusion and the outermost external surface of the wrist member disposed at the end of the arm of the industrial manufacturing robot thereby preventing a dresspack from becoming snagged on the protrusion when one or more of the wrist member and the arm of the industrial manufacturing robot is/are articulated.

11. The industrial manufacturing robot of claim 10, wherein the body is adapted to surround or cover the protrusion.

12. The industrial manufacturing robot of claim 10, wherein the body is adapted to receive the protrusion there through and be held in place by a cap affixed to the protrusion.

13. The industrial manufacturing robot of claim 10, wherein the body is elongated.

14. The industrial manufacturing robot of claim 10, wherein the body is arcuate.

15. The industrial manufacturing robot of claim 10, wherein the body defines an internal cavity that conforms to a shape of the protrusion.

16. The industrial manufacturing robot of claim 10, wherein the body is adapted to be press-fit onto the protrusion.

17. The industrial manufacturing robot of claim 10, wherein the body is manufactured from alternating colored materials such that wear on the body is visible to an observer.

18. A method for installing a snag point cover on an industrial manufacturing robot, the method comprising:
    aligning a cavity disposed on an inner surface of or through a body of the snag point cover with a protrusion disposed on an outermost external surface of a wrist member disposed at an end of an arm of the industrial manufacturing robot, wherein the protrusion comprises a calibration point by which calibration equipment is connected to the industrial manufacturing robot; and
    fastening the snag point cover onto or about the protrusion disposed on the outermost external surface of the wrist member disposed at the end of the arm of the industrial manufacturing robot by one or more of: press-fitting the body of the snag point cover to the protrusion, screwing the body of the snag point cover to the outermost external surface of the manufacturing robot, and affixing a cap to the protrusion that holds the body of the snag point cover in place;
    wherein the body is adapted to form an external transition surface between the protrusion and the outermost external surface of the wrist member disposed at the end of the arm of the industrial manufacturing robot thereby preventing a dresspack from becoming snagged on the protrusion when one or more of the wrist member and the arm of the industrial manufacturing robot is/are articulated.

19. The method of claim 18, wherein the protrusion and the cap are correspondingly threaded.

20. The method of claim 18, further comprising articulating the industrial manufacturing robot with the snag point cover fastened onto or about the protrusion.

\* \* \* \* \*